United States Patent [19]
Bremer et al.

[11] Patent Number: 6,032,190
[45] Date of Patent: Feb. 29, 2000

[54] SYSTEM AND METHOD FOR PROCESSING DATA PACKETS

[75] Inventors: Clark Bremer, Saint Louis Park; Christine E. Severns, Minneapolis; Brian D. Vanderwarn, Maple Grove, all of Minn.

[73] Assignee: Ascend Communications, Inc., Alameda, Calif.

[21] Appl. No.: 08/943,512

[22] Filed: Oct. 3, 1997

[51] Int. Cl.[7] .................................................. G06F 13/00
[52] U.S. Cl. ...................... 709/238; 709/234; 709/236; 709/100; 370/389; 370/413
[58] Field of Search ..................... 395/200.64, 200.66, 395/200.68, 200.75; 709/100; 370/423, 310, 413, 389

[56] References Cited

U.S. PATENT DOCUMENTS

| | | | |
|---|---|---|---|
| 5,398,245 | 3/1995 | Harriman, Jr. ............................ | 370/389 |
| 5,541,920 | 7/1996 | Angle et al. ............................... | 370/61 |
| 5,598,410 | 1/1997 | Stone ....................................... | 709/100 |
| 5,602,841 | 2/1997 | Bebizay et al. ........................... | 370/413 |
| 5,757,799 | 5/1998 | LaRue ...................................... | 370/423 |
| 5,781,549 | 7/1998 | Dai .......................................... | 370/398 |
| 5,841,764 | 11/1998 | Roderique et al. ...................... | 370/310 |
| 5,842,224 | 11/1998 | Fenner .................................... | 711/202 |

Primary Examiner—Ahmad F. Matar
Assistant Examiner—Philip B. Tran
Attorney, Agent, or Firm—Weingarten, Schurgin, Gagnebin, & Hayes, LLP

[57] ABSTRACT

An apparatus and method for processing a data packet to determine the routing of the data packet through a communications network is provided in which the data packet has a header portion and a data portion. The apparatus stores the header portion of the data packet, and processes the header portion of the data packet. The processing may include using a processing core for executing instructions for processing the header portion, searching through a route table to determine a route of the data packet, and searching through a table memory for information about the destination of the data packet in which the route table search, the table memory search and the processing core operate simultaneously to process the header portion and generate an internal header or a network media header. A modified header portion is generated to route the data packet through the communications network. A method for processing data packets to determine the route of the data packet is also provided in which a header portion is received from an incoming data packet, an search based on the received header portion is performed, a route look-up search is performed, and the information contained within the header portion is processed simultaneously for determining if the header portion is valid and generating an internal header or network media header based on the results of the route look-up search, the interface search, and other processing.

21 Claims, 10 Drawing Sheets

| | |
|---|---|
| HD0 | |
| HD1 | |
| HD2 | |
| HD3 | |
| HD4 | |
| HD5 | |
| HD6 | |
| HD7 | |
| HD8 | |
| HD9 | Frame Relay Header |
| HD10 | IP Header Word 0 |
| HD11 | IP Header Word 1 |
| HD12 | IP Header Word 2 |
| HD13 | IP Header Word 3 |
| HD14 | IP Header Word 4 |
| HD15 | Payload Word 0 |
| HD16 | Payload Word 1 |
| HD17 | Payload Word 2 |
| HD18 | Payload Word 3 |
| HD19 | Payload Word 4 |
| HD20 | Payload Word 5 |
| HD21 | Payload Word 6 |
| HD22 | Payload Word 7 |
| HD23 | Payload Word 8 |
| HD24 | Payload Word 9 |
| HD25 | Payload Word 10 |
| HD26 | Payload Word 11 |
| HD27 | Payload Word 12 |
| HD28 | Payload Word 13 |
| HD29 | Payload Word 14 |
| HD30 | DMA Descriptor |
| HD31 | Media Descriptor |

FIG. 7

| | | |
|---|---|---|
| HD0 | Internal GRF Header 0 | |
| HD1 | Internal GRF Header 1 | |
| HD2 | Internal GRF Header 2 | |
| HD3 | Internal GRF Header 3 | |
| HD4 | Internal GRF Header 4 | 214 |
| HD5 | Internal GRF Header 5 | |
| HD6 | Internal GRF Header 6 | |
| HD7 | Internal GRF Header 7 | |
| HD8 | Internal GRF Header 8 | |
| HD9 | Internal GRF Header 9 (Frame Relay Header might not be overwritten) | 204 |
| HD10 | IP Header Word 0 | |
| HD11 | IP Header Word 1 | |
| HD12 | IP Header Word 2 | 206 |
| HD13 | IP Header Word 3 | |
| HD14 | IP Header Word 4 | |
| HD15 | Payload Word 0 | |
| HD16 | Payload Word 1 | |
| HD17 | Payload Word 2 | |
| HD18 | Payload Word 3 | |
| HD19 | Payload Word 4 | |
| HD20 | Payload Word 5 | |
| HD21 | Payload Word 6 | |
| HD22 | Payload Word 7 | 208 |
| HD23 | Payload Word 8 | |
| HD24 | Payload Word 9 | |
| HD25 | Payload Word 10 | |
| HD26 | Payload Word 11 | |
| HD27 | Payload Word 12 | |
| HD28 | Payload Word 13 | |
| HD29 | Payload Word 14 | |
| HD30 | DMA Descriptor | 210 |
| HD31 | Media Descriptor | 212 |

SYSTEM AND METHOD FOR PROCESSING DATA PACKETS

BACKGROUND OF THE INVENTION

This invention relates generally to a system and method for routing data packets in a data communications network, and in particular to a system and method for processing header portions of data packets in order to route the data packets through the data communications network.

The amount of Internet Protocol (IP) data packet traffic being communicated over the Internet, as well as Intranets, has grown exponentially over the past decade. Communications networks are constantly being expanded to handle this growth. The expansion of the communications networks is typically accomplished by partitioning a network that is too large into a number of smaller communication networks in which each smaller network is serviced by a separate router, and then relinking the smaller partitioned networks back together with inter-networking equipment. However, even with this cycle of partitioning and relinking of communication networks, in some environments, such as large-scale public and private data backbones, the data packet traffic has reached such tremendous amounts that these conventional routers cannot handle the data packet traffic and proposed enhancements to these conventional routers cannot keep pace with the ever increasing amount of data packet traffic.

Normally, a conventional router is used in a communications network to route data packets through the network from a first location, known as a source, to a second location, known as a destination. These conventional routers typically have a single shared data bus so that each data packet received by the router must wait for access to the shared bus before being forwarded to the next network "hop" along the data path to the destination address of the data packet. A portion of a route table for a router, which is used to determine the next network hop for a data packet, is typically stored in a cache memory. The portion of the route table stored in the cache memory is typically the most frequently used next network addresses. Using the route table data stored in the cache, the router attempts to determine the next network address for a particular data packet. If the next network address of the data packets is not contained in the portion of the route table in the cache, the data packet is further delayed while a complete software-based route table look-up is performed. If the route table is large, the delay caused by the full software route table look-up may be substantial. Thus, the delay associated with contention for the shared bus and the route table caching and look-up problems of conventional routers lead to poor data packet transfer performance or lost data packets when a conventional router is placed in a large, dynamic network, such as the Internet. Thus, these conventional routers cannot achieve the data packet processing rates necessary for the future needs of the Internet and other high speed computer networks.

Instead of a conventional router with a shared bus architecture, a new class of the network switches and packet processing systems have been developed that attempt to efficiently process and transfer data packets through a switch to the next hop network. These packet processing systems attempt to overcome the problems with a conventional router by processing data packets more rapidly than conventional routers. The speed of the processing of the data packets may be increased in a number of different ways. For example, one conventional packet processing system and method receives an incoming data packet and splits the incoming data packet into a header portion and a data portion. The data portion is stored in a conventional buffer memory while the header portion is stored in a cache memory which has a faster access time than the buffer memory. The cache memory permits the processor to rapidly access the header portions of data packets. The quicker access to the header portions of the data packets, since the processor needs to process the header portion to determine the next hop network address for a data packet, increases the data packet processing speed. Since the processor does not need quick access to the data portion to process a data packet, the storage of the data portions in a slower access buffer memory is acceptable. Once the next hop network address has been determined, the header portion and the corresponding data portion are combined back together and the data packet is sent on to its next hop network. Although the header portion is stored in a fast access time cache memory, the time it takes for the processor to access the cache memory is still slow and ultimately limits the overall processing speed of the packet processing system. In addition, the time required to access a route table in these systems is slow.

Thus, there is a need for a system and method for processing data packets which avoid these and other problems of known systems and methods, and it is to this end that the present invention is directed.

SUMMARY OF THE INVENTION

In accordance with the invention, a system and method for processing data packets is provided in which a hardware based data packet processing system efficiently processes data packets by reducing the amount of time associated with retrieving header information from a memory and associated with a route table look-up. To reduce the route table look-up time, a hardware implemented look-up system is used that requires a single memory access per node to retrieve information from a search tree that is used to search the route table for a next hop network address. To reduce the time associated with memory accesses, the data portion of a data packet is stored in a buffer memory while the header portions are stored directly into a plurality of hardware registers that are directly accessible by a processor. In addition, the system may have two sets of header registers so that while a header in one set of the registers is being accessed and processed by the processor, a previously processed header may be unloaded and a next unprocessed header may be loaded into the second set of registers so that there is minimal downtime in between the processing of headers. Thus, when a first header processing is complete and a new header may be processed by the processor, the header portion is already present in the set of registers and loading the header from a memory location is not required.

In addition, the invention also provides a mechanism so that the data packets that are going to be dropped are immediately removed from memory. The system also provides a unique method for processing multicast data packets. The processor within the system may have a separate route table search engine and a table search engine so that a route table search, a table search and the processing of other information in a header may occur simultaneously which reduces the time to process a header. To further reduce the processing time of a header, most of the data being operated on by the system may be stored in hardware registers.

Thus, in accordance with the invention, an apparatus and method for processing a data packet to determine the routing of the data packet through a communications network is provided in which the data packet has a header portion and a data portion. The apparatus stores the header portion of the data packet, and processes the header portion of the data packet. The processing may include using a processing core for executing instructions for processing the header portion, searching through a route table to determine a route of the data packet, and searching through a table memory for information about the destination of the data packet. The header loading/unloading, the route table search, the table memory search, and the execution of header processing instructions may occur simultaneously. A modified header portion is generated to route the data packet through the communications network.

In accordance with another aspect of the invention, a method for processing data packets to determine the route of the data packet is also provided in which a header portion is received from an incoming data packet, a media information search is performed for certain types of data packets based on the received header portion, an interface search based on the received header portion is performed, and a route look-up search is performed simultaneously with said interface search. The information contained within the header portion is processed while said interface search and said route look-up search are being performed for determining if the header portion is valid and generating an internal header based on the results of the route look-up search and the interface search.

BRIEF DESCRIPTION OF THE DRAWINGS

FIG. 7 is a diagram illustrating a header stored in a set of header registers prior to processing by the packet processing unit;

FIG. 8 is a diagram illustrating a modified header stored in the set of header registers after the processing by the packet processing unit.

DETAILED DESCRIPTION OF A PREFERRED EMBODIMENT

The invention is particularly applicable to a system and method for processing messages in a communications network. This communications network may be a network which processes data packets such as the Internet or may be a network that processes telephone calls such as a telephone switching network. It is in this data communications context that the invention will be described. It will be appreciated, however, that the system and method in accordance with the invention has greater utility.

Figure 1:
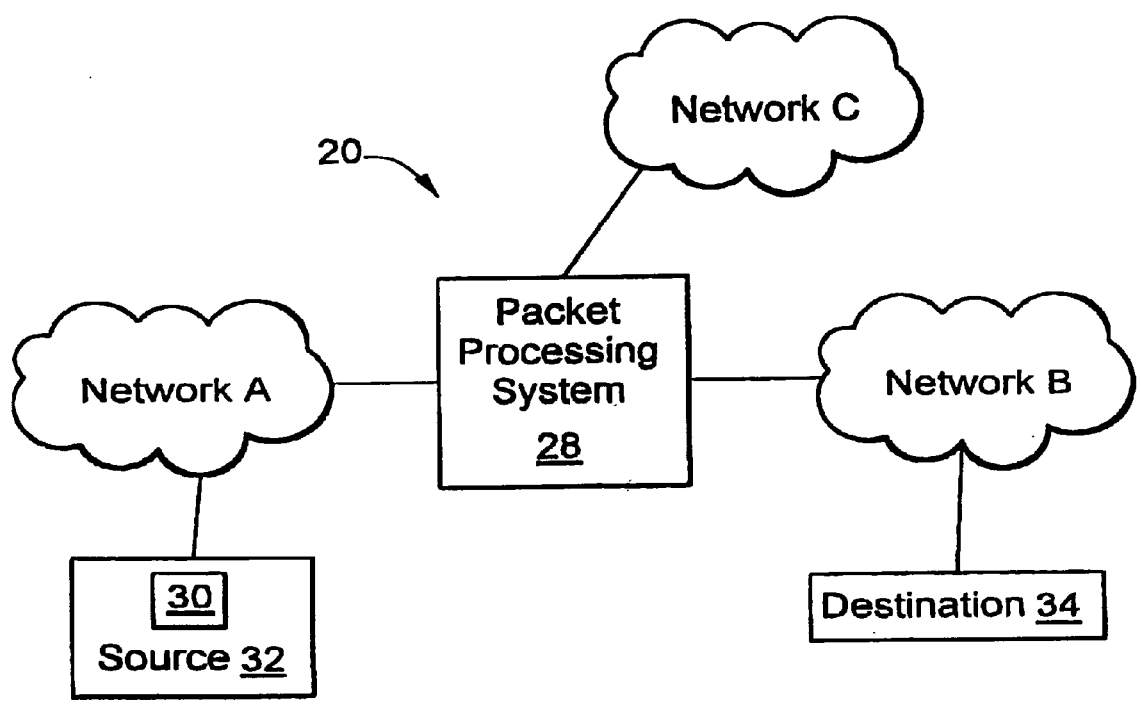
FIG. 1 is a block diagram of a typical communications network that includes a packet processing system in accordance with the invention.

FIG. 1 is a block diagram illustrating a communications network 20 that may contain a plurality of computer networks, such as network A, network B, and network C, which are interconnected together by a packet processing system 28 in accordance with the invention. The packet processing system receives data packets from one of the computer networks, determines the appropriate next computer network that the data packet should be sent to, and communicates the data packet to the proper next computer network. For example, a data packet 30 originates at a source host computer 32 attached to computer network A and has a destination of a destination host computer 34 attached to network B. To communicate the data packet between the source host computer and the destination host computer, the data packet is communicated to the packet processing system 28 which determines, based on a header portion of the data packet as described below, that the path of the data packet is to computer network B since the destination host computer 34 is attached to that network. Therefore, the data packet 30 is forwarded to computer network B and then on to the destination host computer. The communications network shown is a very simple network but the packet processing system may also route data packets for complex communication networks, such as the Internet.

A certain amount of time is required for a packet processing system such as shown in FIG. 1 to process a data packet. In particular, the packet processing system must determine the proper route of the data packet and then communicate the data packet along the proper route. It is desirable that the time that the data packet is processed by the packet processing system be minimized so that the time that a data packet is delayed through the communications system is minimized. In accordance with the invention, the packet processing system significantly reduces the time required to process and route a data packet, as described below, which increases the speed that data packets may be communicated over the communications network. To understand how the time required to process and route data packets is reduced, more details of the packet processing system in accordance with the invention will now be described.

Figure 2:
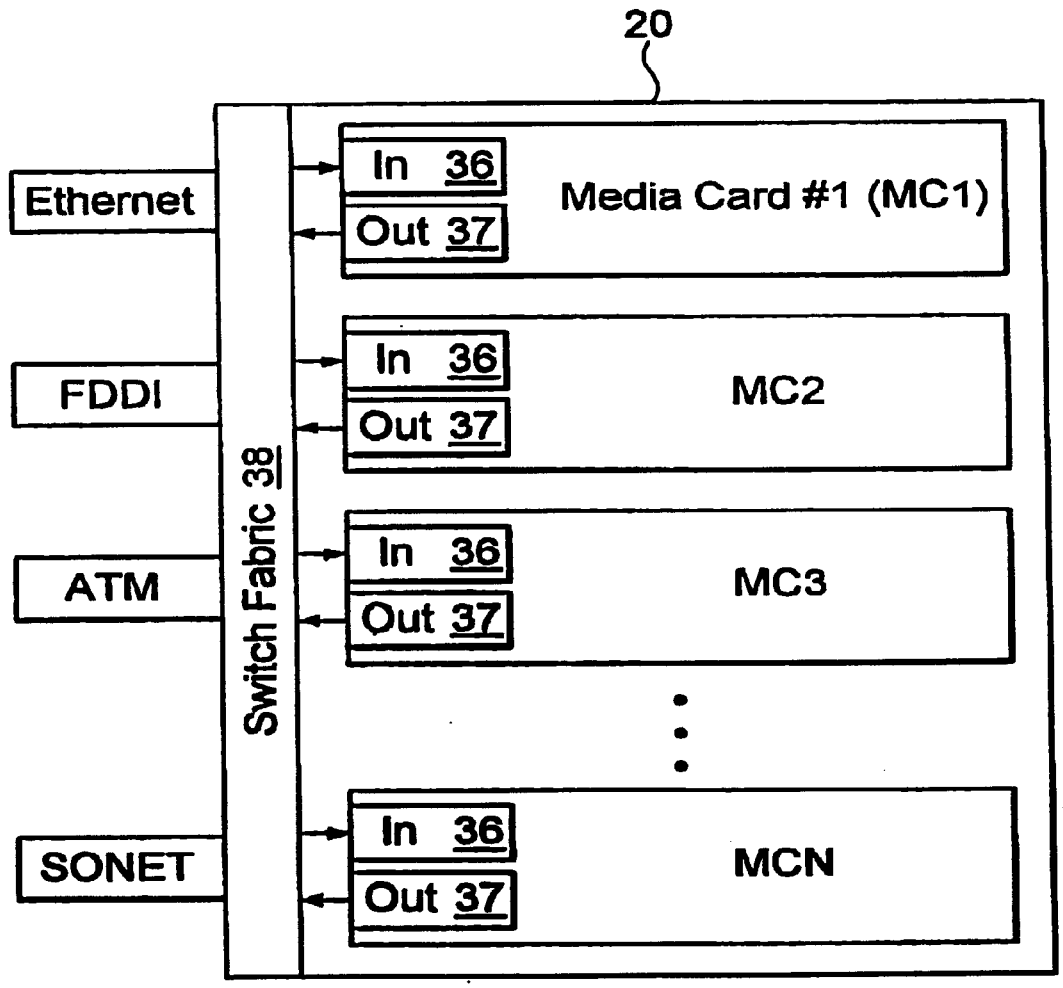
FIG. 2 is a more detailed diagram of the packet processing system.

FIG. 2 is a block diagram of an example of the packet processing system 28, which may include a plurality of media cards, such as a first media card MC1, a second media card MC2 and a third media card MC3. Each media card may receive and transmit data packets over a particular type of media. In the example shown, an Ethernet media card, a Fiber Distributed Data Interface (FDDI) media card, an asynchronous transfer mode (ATM) media card and a SONET media card are provided. Each media card may have a plurality of input ports 36 for receiving data packets and a plurality of output ports 37 for outputting data packets. A particular port on a media card may be capable of receiving and transmitting data packets simultaneously. A data packet may be received by one media card over a first media, but that data packet may be output by the first media card over a different port or by a second media card over a second media. When a packet is destined for a different media card, the packet may be sent to the second card over a switch fabric 38. For example, an incoming ATM data packet may be received by MC3 and the media card determines that the data packet is going to be output over an Ethernet network to reach its destination. Therefore, the data packet is processed by MC3, sent over the switch fabric to MC1 and output by MC1 over the Ethernet network. Thus, the packet processing system handles data packets from a plurality of different medias. Now, a media card will be described in more detail.

Figure 3:
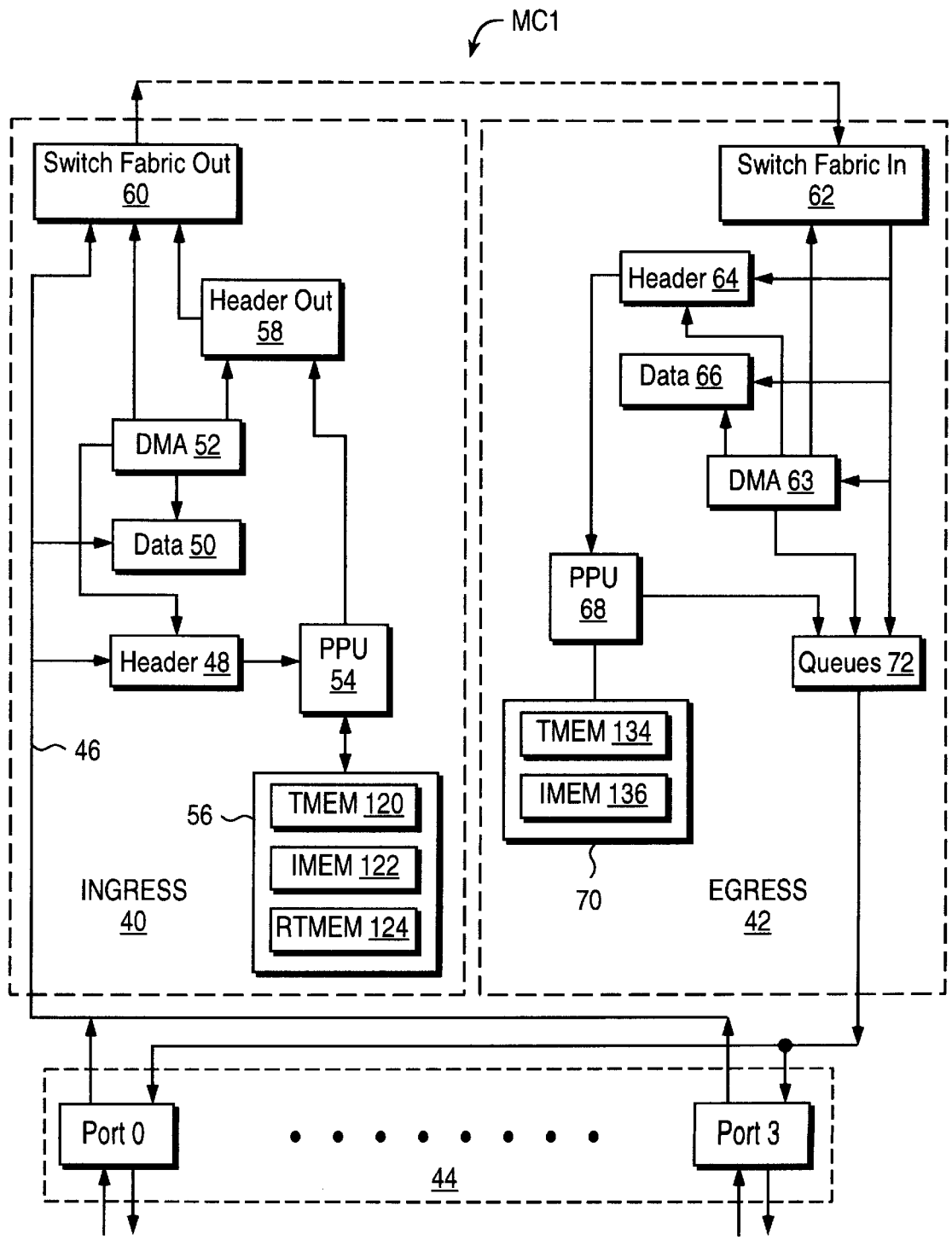
FIG. 3 is a block diagram illustrating a media card for the packet processing system shown in FIG. 2.

FIG. 3 is a block diagram illustrating more details of a media card MC1 in the packet processing system 28 in accordance with the invention. Each media card may be similar so only one will be described here. Each media card may include an ingress portion 40 and an egress portion 42. The ingress portion receives data packets from an external source, such as the particular type of media and processes those data packets to determine the appropriate route for the data packet, as described below. The egress portion reformats the received data packet, determines the appropriate physical network address based on the route determined by the ingress portion, and communicates the data packet to a computer network connected to the packet processing system. A plurality of media ports 44 are attached to both the ingress and egress portions, and these media ports communicate the data packets with the computer networks connected to the packet processing system. In the example of the packet processing system shown in FIG. 3, there are four media ports including port 0 through port 3. At any time, there may be data packets entering and exiting each media card for all of these media ports simultaneously.

A data packet entering the media card from a media port has a header portion and a data portion. The header portion contains information about the data packet such as the address of its destination, the type of media it is being transmitted over and other characteristics about the data packet. The data portion contains the actual data being communicated. The details of the header portion and data portion will be described below. Once a data packet enters the media card at the ingress portion 40, the data packet is separated into the header portion and the data portion and each of these portions is transferred over a bus 46 to a header in store 48 and a data buffer memory 50, respectively. A direct memory access (DMA) controller 52 controls the transfer of data between the various components within the ingress portion 40. To ensure that the header portion can be later reunited with the correct data portion, a descriptor, stored with the header portion and separately from the data portion, may indicate which data portion is associated with each header portion. The header portion of the data packet in the header in store is transferred to a packet processor unit (PPU) 54 that determines the next hop network address for the data packet based on the information contained in the header portion, as described below.

To determine the next hop network address, the PPU 54 may perform a route table search using a route table memory 124. Once the PPU has determined the next hop network address for the data packet, the PPU may add additional information, such as the next hop network address, into the header portion, as described below, and the DMA 52 is notified of the completion of header processing. The DMA then transfers the header portion of the data packet from the PPU to a header out store 58. When the modified header portion has reached the header out store 58, the DMA senses that and then reunites the header portion with the data portion which is still contained in the buffer memory 50 using the descriptor and communicates the entire data packet to a switch fabric out port 60. The data packet is then communicated by the switch fabric out port 60 over a switch fabric 38, as shown in FIG. 2, of the packet processing system to a switch fabric in port 62 which is part of the egress portion 42 of the packet processing system. In this example, the switch fabric in port and the switch fabric out port are located on the same media card since the data packet is entering and exiting on the same media, but the ports may also be located on different media cards since the system may include a plurality of media cards connected together to handle various types of media.

A DMA 63 of the egress portion is then alerted to the presence of the data packet in the switch fabric in port and the DMA splits the header portion from the data portion and directs the header portion to a header in store 64 and the data portion to a data buffer memory 66. The header portion, including any additional information added by the ingress PPU 54, is then transmitted to a second packet processor unit (PPU) 68 which processes the header portion and determines the appropriate physical address of the next hop network from the next hop network address stored in the header portion by the ingress PPU 54 based on a table stored in the table memory 120 connected to the egress PPU 68. Once the proper physical address is determined, the DMA reunites the header portion with its appropriate data portion and transfers the data packet to one or more queues 72. The queues holds the data packet until the media port is prepared to transmit the data packet to its next hop network. One or more queues are utilized to separate traffic destined for different output ports and to prioritize the data packets.

For incoming data packets that are destined for more than one destination (e.g., multi-cast data packets), the packet processing system may advantageously store a single copy of the data portion in the buffer memory and then generate a plurality of header portions for each destination. To facilitate this, the descriptors that are generated by the first PPU 54 permit multiple headers portions to correspond to the same data portion. Thus, only a single copy of the data portion of the data packet is required for a multi-cast data packet which reduces the storage required to route a multi-cast data packet and increases the speed with which the multicast data packet is processed. To facilitate this multi-casting, the descriptor may have a free buffer bit which is normally set by the ingress PPU 54 for non-multi-cast data packets so that the data portion is removed from the buffer memory once the data packet has been forwarded. For a multi-cast data packet, on the other hand, the free buffer bit is only set for the last header that references that data portion so that the data portion remains in the buffer memory until the multi-casting operation has been completed.

As described above, once a header of a data packet has been received, the DMA is alerted and the header portion is transferred to the packet processing units 54 which processes the information contained within the header portion and determines, among other things, the next hop address for the data packet. In some embodiments of the invention, there may be multiple PPUs that simultaneously process headers. Each PPU operates in the same manner and will be described in more detail below with reference to FIGS. 4–5. In addition, the method of processing a header in accordance with the invention will be described below with reference to FIGS. 6A and 6B. Each PPU utilizes the set of memories 56 to process the header. The set of memories may include a table memory (TMEM) 120, an instruction memory (IMEM) 122 and a route table look-up memory (RTMEM) 124. The TMEM may hold tables to look up information about a data packet, the IMEM may hold the instructions being executed by the PPU and the RTMEM may store a route table for determining a route of a data packet. The operation of these memories will be described below.

Once the header has been processed by one of the PPUs, an internal header is generated by the PPU and the internal header is included in the original header portion to form a modified header portion. Instead of an internal header, a network media header may also be generated by the PPU. The modified header portion is then stored in the header output store 58. Once the header reaches the header output store, the DMA 52 is alerted and the header portion with the internal header and the data portion are reunited in the switch fabric out port 60. Then the entire data packet may be transmitted over the switch fabric of the packet processing system. The data packet transmitted over the switch fabric may be received by the switch fabric in port 62. The data packet with the internal header is then processed by the PPUs 68, that may be a pair of PPUs that may simultaneously process two headers, and then transmit the processed headers to the queues 72. Each PPU may have a set of memories 70 that store data and instructions used by the PPU to process the header. In particular, a table memory 134 (TMEM) and an instruction memory 136 (IMEM) are provided. For the egress portion 42, a RTMEM is not necessary since the route of the data packet has already been determined. The PPUs in the egress portion remove the internal header, and generate the appropriate physical address for the particular media. Then the data packet with the proper header is transmitted out over the media. Now, the details of the PPU will be described with reference to FIGS. 4 and 5.

Figure 4:
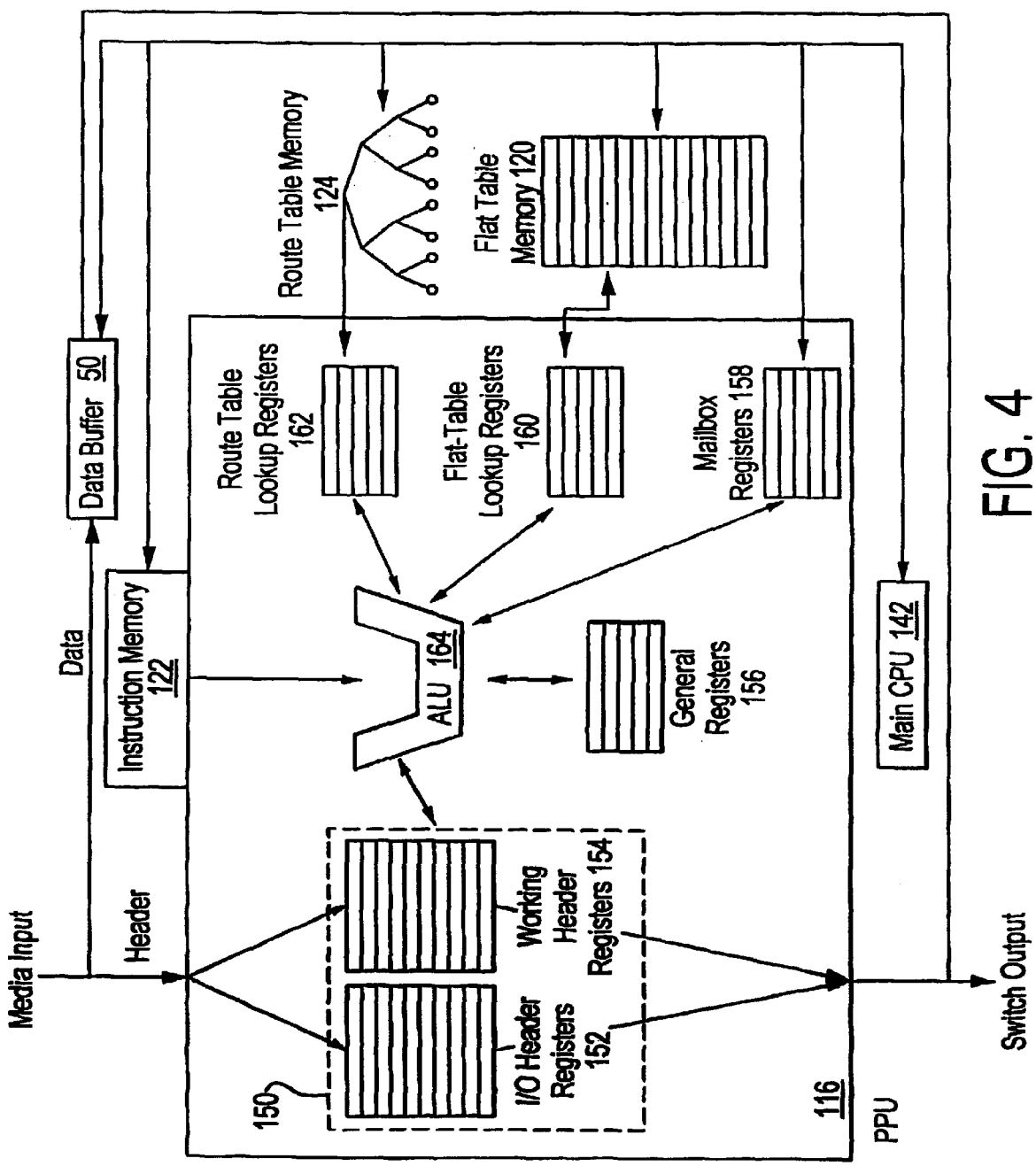
FIG. 4 is a diagram illustrating the data flow through the media card of FIG. 3.
Figure 5:
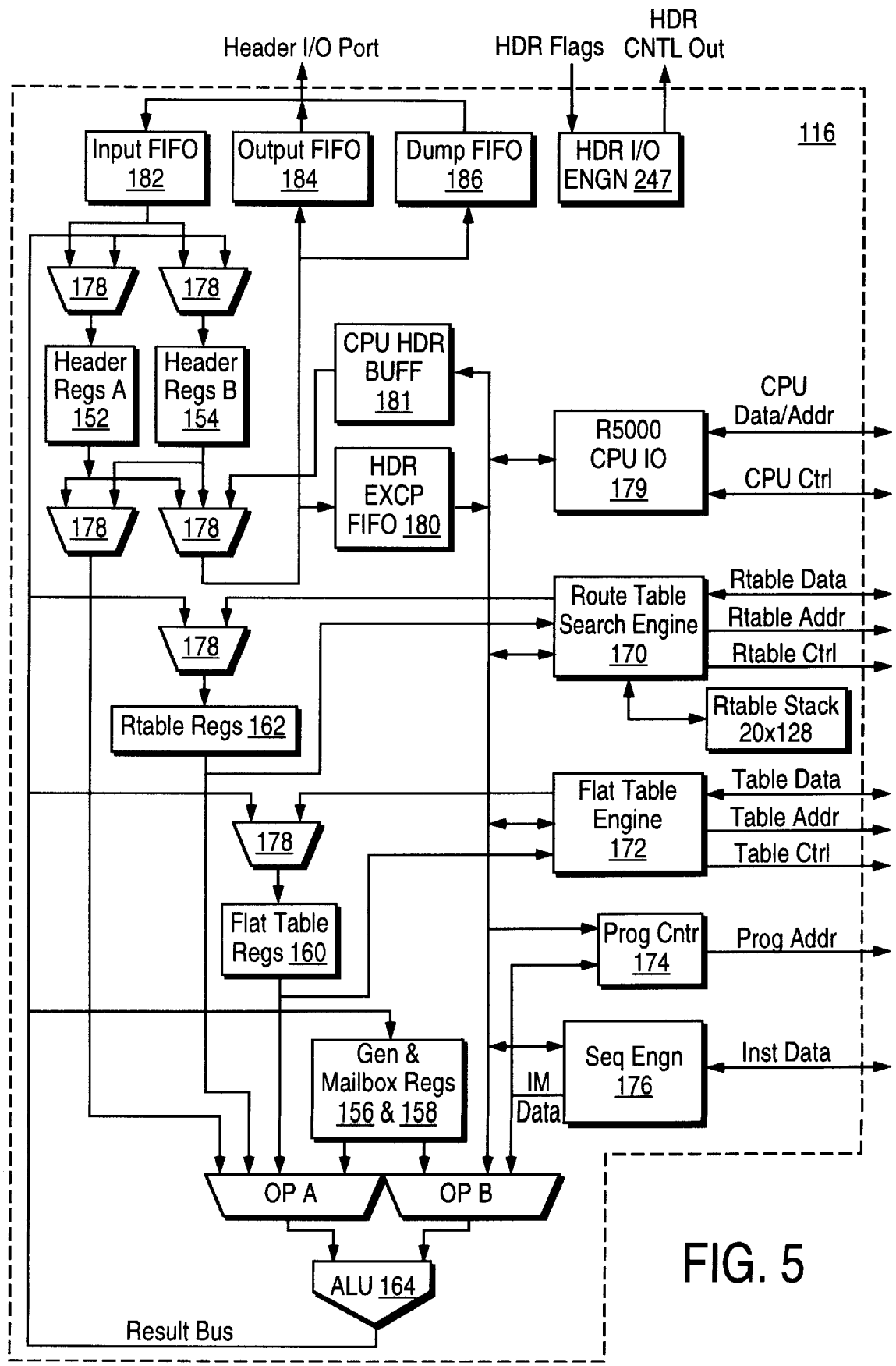
FIG. 5 is a block diagram illustrating the details of the packet processing unit (PPU) of FIG. 4.

FIG. 4 is a block diagram illustrating the major components of the PPU along with the associated memories and other external components. FIG. 5 is a block diagram illustrating the details of the packet processing unit 116 in accordance with the invention. The PPU described is one of the PPUs that reside on the ingress portion of a media card. The egress PPUs may be similar and will not be described. The CPU 142 and the data buffer 50 are shown for reference and are not part of the PPU. As each of the plurality of data packets enter the media card (not shown), the header portion is split from the data portion. As described above, the data portion is stored in the data buffer memory 50. The header portion is transferred to the header in store 48 shown in FIG. 3 and then into a set of header registers 150. In accordance with the invention, there may be a first set of header registers 152 and a second set of header registers 154 so that, as a header in the first set of registers is being processed by the sequence engine 176 as shown in FIG. 5, the next header to be processed by the sequence engine may be loaded into the second set of header registers. Thus, once the PPU has completed processing a header, it can start processing the next header during the next clock cycle since the next header is already loaded into the second set of registers. In addition, a processed header may be unloaded from a set of registers while another header is being processed by the PPU. Therefore, the delay associated with loading and/or unloading the header into and out of the registers is minimized which increases the speed that headers may be processed by the PPU.

In accordance with another aspect of the invention, the PPU operates using a plurality of registers that may be more rapidly accessed than conventional memories. These registers hold various data being operated on by the sequence engine 176, the ALU 164, the table engine 172, and the route table search engine 170, all of which are as shown in FIG. 5, and instructions between the functional units within the PPU. As shown, the PPU may have the set of header registers 150, a set of general registers 156, a set of mailbox registers 158, a flat table look-up set of registers 160, and a set of route table look-up registers 162. Each of these registers will be described below. The heart of the PPU may be a processing core, such as an arithmetic logic unit (ALU) 164, that receives microcode instructions from the instruction memory 122. Through the sequence engine 176, and in accordance with the invention, the ALU accesses information and data from any of the registers in order to process a header portion of a data packet and also executes instructions stored in the instruction memory. In addition, due to the architecture of the PPU, the load and/or unloading of the headers, the flat table and route table searches and the other header processing may occur simultaneously which decreases the total time that it takes for a PPU to process a header. The ALU may execute a plurality of unique microcode instructions.

Some of these unique instructions may be specialized for processing data packets such as, for example, Internet Protocol (IP) data packets. Several examples of some of these specialized data packet processing instructions include a jump using vector register (JVEC) instruction, a SEND instruction, a SENDM instruction, an EXCP instruction, an EXCPM instruction, and a DROP instruction. Each of these instructions will be described below. The SEND instruction sends a processed header portion of a data packet to an output FIFO 184 of the PPU so that the data packet may be forwarded and loads a next unprocessed header. The SENDM instruction is used for multicast data packets as described below with reference to FIG. 9. The EXCP instruction sends a header portion of a data packet to an exception header buffer 180 and loads a next unprocessed header while the EXCPM instruction sends a header portion of a multi-cast data packet to the exception header buffer 180 and reuses the header portion in a similar manner to the SENDM instruction. The DROP instruction discards the data packet, loads the next unprocessed header portion into the PPU and places information about a data packet to be discarded into a drop FIFO 186 so that the memory space occupied by the discarded data packet may be reused immediately. Thus, these specialized instructions permit the PPU to quickly process data packets. Now, the JVEC instruction will be described.

The JVEC instruction and the associated vector registers that are accessed by the JVEC instruction permit the CPU to steer the execution by the PPU to certain routines. In operation, the PPU may execute a set of instructions until a JVEC instruction is encountered and then the next instructions to be executed by the PPU will be determined based on the address in the vector registers. The address in the vector registers is determined by the CPU so that the CPU may direct the PPU to different routines depending on the state of the PPU.

The JVEC instruction has three choices of routines to which it can direct the PPU including a idle routine, a packet routine and an interrupt routine. The selection of the vector routine is on a priority basis so that, for example, if the interrupt vector has been updated since the last time a JVEC instruction was executed, then the interrupt routine is selected regardless of the status of the other vector registers. Thus, the interrupt vector has the highest priority. The second highest priority vector routine is the packet routine which is executed if the header I/O engine indicates that a new header is ready for processing and there is no interrupt vector. The lowest priority routine is the idle routine which is the default routine and will be executed only if neither of the other vector conditions have occurred.

An example of the JVEC instruction as used during normal data packet processing may be:

```
IDLE:
        JVEC;
        NOP;
PACKET:
        //process packets here
        .
        .
        //packet processing completed
```

```
    -continued
SEND;
JVEC;
NOP;
```

In this example, after the PPU has completed the processing of a header portion and has issued a SEND instruction which places the header portion in the output FIFO, as described above, the JVEC instruction is executed. In this example, there is no header portion to be processed by the PPU so the vector registers have been loaded with the address of the IDLE routine and the PPU executes the instructions within the IDLE routine. In the IDLE routine, the PPU executes another JVEC instruction which returns the PPU to the IDLE routine as long as there are no header portions ready for processing and the interrupt vector has not been written since the last JVEC instruction. When a header portion is ready for processing, the sequence engine is alerted and chooses the address in the packet vector register and the PPU will begin executing the instructions in the PACKET routine the next time that it executes the JVEC instruction. In addition, as conditions in the packet processing system change, the CPU may change the address in the vector registers to direct the PPU to another routine. For example, if the CPU determines that the packet processing system is low on buffer space, it may direct the PPU to execute a different packet routine which implements the selective discarding of data packets until more buffer space is available.

In addition, the use of the JVEC instruction may permit the CPU to update the packet processing code. To update the packet processing code, the CPU steers the PPU to special routine where it will no longer process packets. The PPU, through the mailbox registers, will indicate that it is currently executing this special routine so that the CPU may halt the PPU and update the instruction memory with the desired changes. Once the code has been updated, the vector registers are re-initialized and the PPU is unhalted. The update method prevents the PPU and the packet processing system from losing header data and those buffer memory regions associated with a packet because the PPU was halted only after the current header being processed has been completed. Now, other components associated with the PPU will be described.

The set of general registers may store a variety of general information used by the ALU 164. The mailbox registers 158 permit the ALU to communicate with the CPU 142. The flat table look-up registers permit the ALU to request that a flat table look-up search, as described below, be performed by a table engine 172 shown in FIG. 5 and the results of the flat table search be stored in the flat table registers 160 so that the ALU may access the results. The route table look-up registers 162 permit the ALU to request a route table look-up search from a route table search engine 170 shown in FIG. 5, as described below, and the results of the route table search are stored in the route table registers 162. The ALU may then retrieve the results of either a route table search or a flat table search from the appropriate registers. In accordance with the invention, the flat table and route table searches may be performed simultaneously by the respective table engines and do not require any processing time of the ALU, as described below. In accordance with the invention, the data being accessed by the ALU and the search engines are contained in hardware registers since these are more rapidly accessible than conventional memories. This has the result of increasing the speed with which a header may be processed by the PPU.

The processing of the header portion will now be briefly described. It will be described in more detail below with reference to FIGS. 6A and 6B. Once the header portion has been loaded into one of the header registers 152, 154, the ALU accesses a portion of the header register, as described below, and requests that a flat table search be conducted by the table search engine 172 using a portion of the header by writing an instruction into the flat table registers 160. The ALU then reads a second portion of the header and requests that a route table search be performed by the route table search engine 170 based on the portion of the header by writing an instruction into the route table search registers 162. While the flat table and route table searches are being performed by the respective search engines, the ALU may perform additional processing on the header such as verifying the checksum contained in the header, decrementing a Time To Live (TTL) value in a portion of the header and recalculating a checksum value. Once the searches have been completed and the results are returned to the registers, the ALU may generate an internal header which includes the results of the flat table search and the route table search and attach the internal header to the existing header stored in one of the header registers 152, 154. The modified header portion is then reunited with the data portion and output to the switch fabric, as described above. Additional details about the structure of the PPU will now be described.

FIG. 5 is a block diagram illustrating the details of the packet processing unit 116 in accordance with the invention. In addition to the ALU 164 and the various registers described above, the PPU may also include a route table search engine 170, a flat table engine 172, a program counter 174, a sequence engine 176 and a CPU interface 179 that permits the CPU 142 shown in FIG. 4 to access some of the PPU's registers and each of the PPU's associated memories. The various engines are tightly coupled together which further increases the processing speed of the PPU. To tightly couple these components together, these components may reside on the same semiconductor chip. The CPU may control some of these functional blocks. The route table search engine 170 performs a route table look-up search when an instruction is placed in the route table registers 162. The flat table look-up search engine 172 may perform a flat table search when an instruction is placed in the flat table registers 160. The program counter 174 keeps track of the address of the microcode being executed and the sequence engine 176 fetches and decodes the next microcode instruction to be executed by the ALU 164. The sequence engine also has the ability to execute conditional branches based on the results of the ALU.

To route the data between these units within the PPU, a plurality of multiplexers 178 are used. In addition, a header input/output (I/O) engine 247 is provided which controls the flow of headers into and out of the PPU. To facilitate the movement of the headers within the PPU, the header I/O engine 247 may control an input buffer 182, an output buffer 184, a dump buffer 186, a header exception buffer 180 and a CPU header buffer 181. The header I/O engine controls header movement between the sets of header registers 152, 154 and the input buffer, the output buffer, the dump buffer and the header exception buffer. The header I/O engine also controls header movement between the CPU header buffer and the input buffer, the output buffer, the dump buffer and the header exception buffer. The header I/O engine may control the input buffer 182 that receives unprocessed headers entering the PPU and the output buffer 184 for sending headers that have been processed to the output header buffer of the packet processing system. In addition, the header I/O engine may also control the dump buffer 186 which holds descriptors for data packets that are going to be dropped by the packet processing system because, for example, the header contains corrupt information. The dump buffer may be directly connected to the DMA 52 shown in FIG. 4 so that the data portion that corresponds to the dumped header portion may be discarded and the buffer space occupied by the data portion in the buffer memory 50 shown in FIG. 4 may be immediately reused. The header I/O engine may also control a header exception buffer for data packets that can be processed more efficiently by the CPU. The header I/O engine may control a CPU header buffer for headers that were processed by the CPU. In this manner, the header I/O engine has a plurality of different options for routing an incoming or outgoing header portion from the PPU. Now, a method for processing a header portion of a data packet in accordance with the invention will be described with reference to FIGS. 6A, 6B, 7, and 8.

Figure 6A:
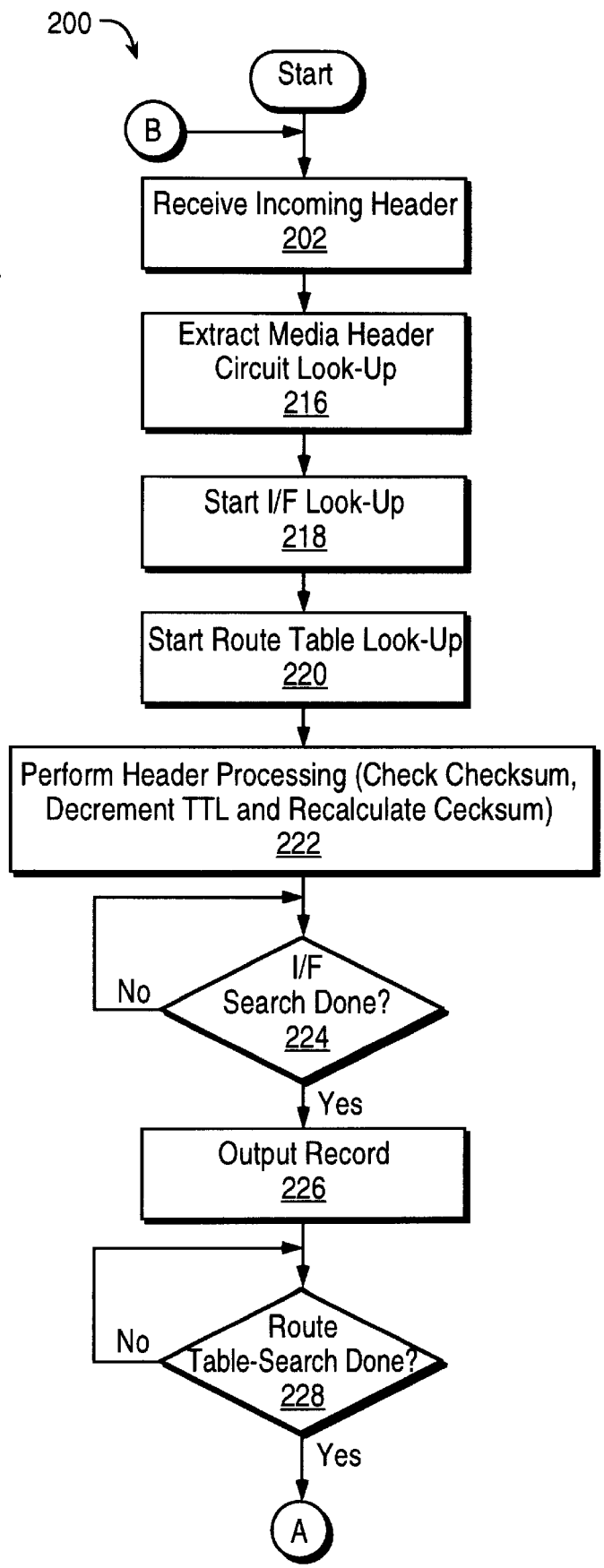
FIGS. 6A and 6B are a flowchart illustrating a method for packet header processing in accordance with the invention.
Figure 6B:
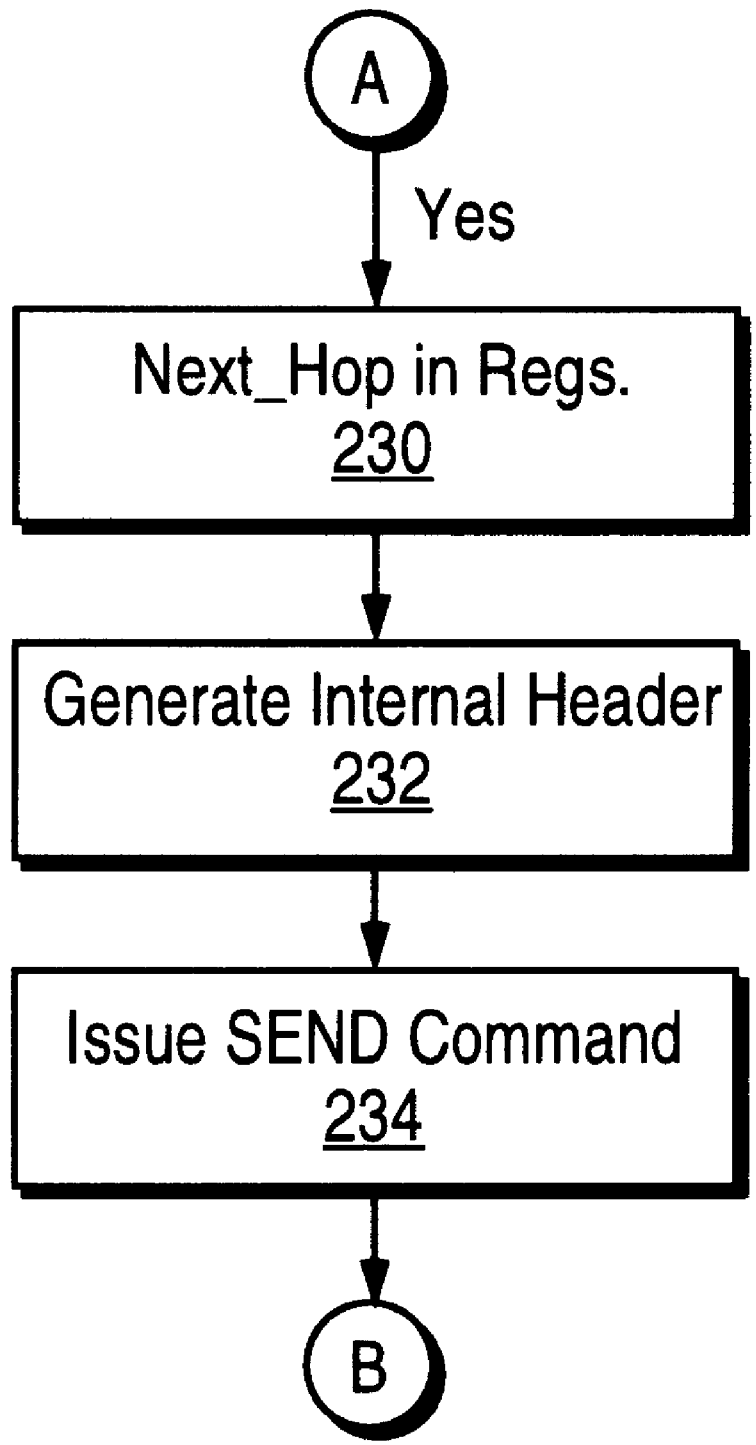

FIGS. 6A and 6B illustrate a flowchart detailing the steps of a method 200 for processing a header portion of a data packet in accordance with the invention. FIGS. 7 and 8 are diagrams which illustrate an example of the contents of the header registers prior to processing by the PPU and after processing by the PPU. Returning to FIG. 6A, the method begins at step 202 in which the next header portion to be processed by the ALU is stored in one of the set of header registers and is ready for processing. As shown in FIG. 7, in this example, the first set of header registers 152 has a total of thirty-two registers and the header portion of the data packet starts at header register 9 (HD9) and fills the rest of the registers. In this example, a frame relay data packet header is shown which may include the frame relay header 204, an IP packet header 206, payload data 208, a DMA descriptor 210 and a media descriptor 212. A data packet from another type of media may have a slightly different header format and may be stored starting at a different individual header register. The PPU in accordance with the invention may process a plurality of different types of data packets transmitted over a plurality of different medias, such as FDDI or Ethernet or frame relay and the header portions for each of these data packets is slightly different, but can also be processed by the PPU. The first nine registers (HD0–HD 8) 214 are used to store the internal header generated by the PPU, as described below.

Once the header portion has been received, the PPU extracts the frame relay header 204 in step 216, and requests a flat table search to be conducted to retrieve an entry for this frame relay circuit in a circuit table contained in the table memory. Step 216 may be executed for frame relay or ATM data packets, but is not executed for other types of data packets. Next, in step 218, a second flat table search is conducted into the interface table using the inbound interface number contained in the header portion. Next, in step 220, while the other flat table search is being performed, the PPU requests that a route table search is conducted using the destination IP address contained in HD14 in this example. While these searches are being conducted by the appropriate search engines, the PPU may, in step 222, perform additional header processing and header information checks that do not require the results of the searches, such as verifying the checksum in the header, decrementing the Time To Live (TTL) value and recalculating the checksum. Once these checks have been performed, the PPU determines if the interface table look-up has been completed in step 224 and waits, if it has not been completed. When the results of the interface table have been received, the PPU ensures that the appropriate inbound interface has been correctly configured, increments the interface statistics and writes the record back into the table memory in step 226. In step 228, the PPU determines if the route table search has been completed and waits until it has been completed. Once the results of the route table search are available, the next hop address is placed in the route table registers in step 230 by the route table search engine. In step 232, assuming the next hop address is correct, the PPU generates an internal header in HD0–HD9 214 using the next hop address information. A modified header that contains the internal header is shown in FIG. 8. Once the header has been modified to include the internal header, the PPU issues a SEND command in step 234. The header register sets are then switched, the processed header is unloaded, and the modified header is reunited with the data portion by the DMA and transmitted across the switch fabric. After transmission, the storage for the data portion in the buffer is released. The method loops back to step 202 immediately upon the switching of the header register sets and begins processing another header portion. As described above, due to the architecture of the PPU, only a single clock cycle elapses between the end of a header processing and the start of the next header processing. In addition, the PPU performs a plurality of operations in parallel, such as header loading and/or unloading, the flat table and route table searches, and other header processing, which substantially reduces the time required to process a header. Now, a method for processing multicast data packets in accordance with the invention will be described.

Figure 9:
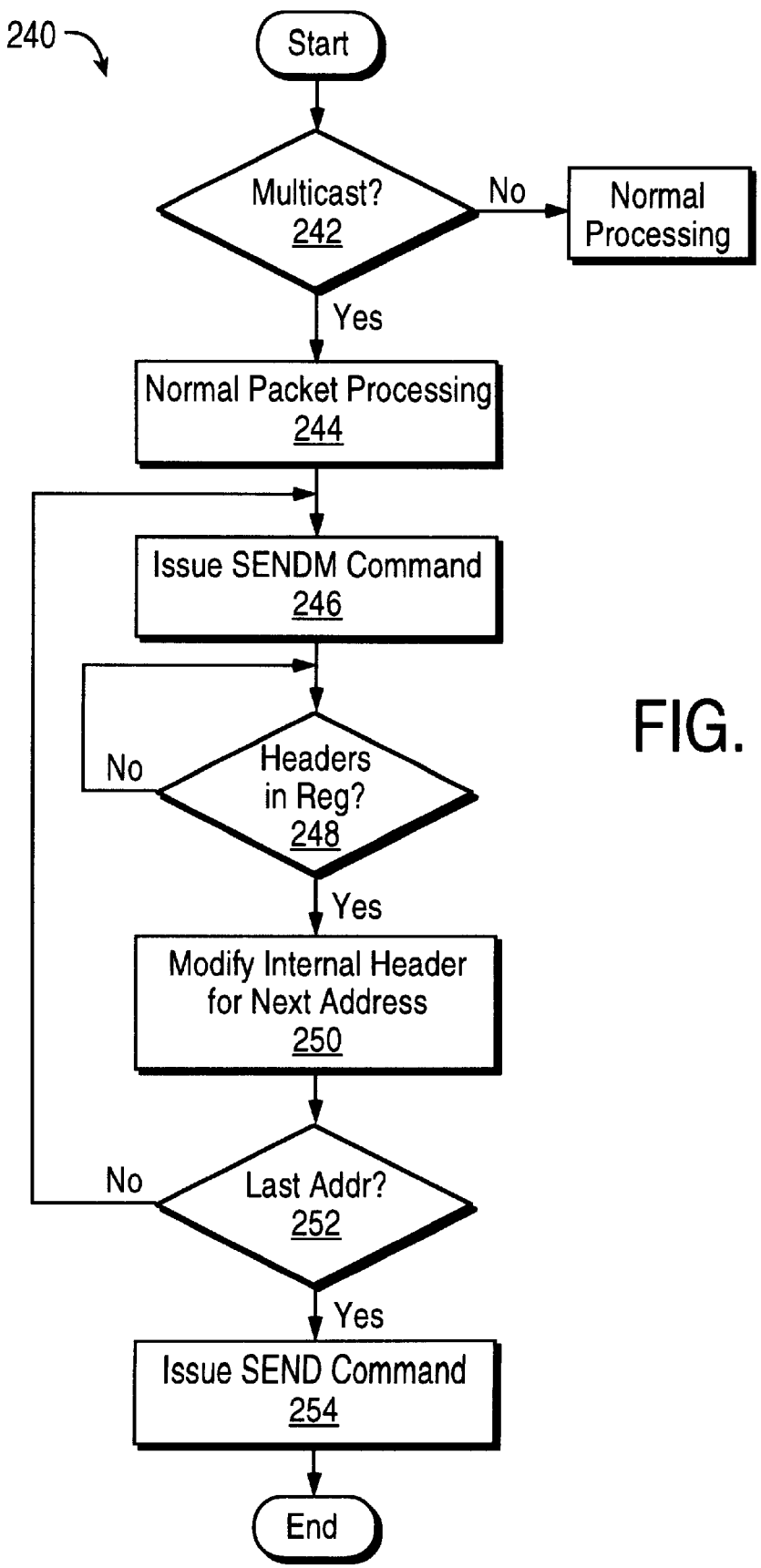
FIG. 9 is a flowchart illustrating a method for multi-cast data packet processing in accordance with the invention.

FIG. 9 is a flowchart illustrating a method 240 for processing the header of a multicast data packet in accordance with the invention. In step 242, the PPU determines, from data in the header portion, whether the data packet is a multicast data packet (e.g., a data packet destined for more than one destination). If the data packet is not a multicast data packet, normal header processing as described above occurs. If a multicast data packet is encountered, the header is processed, as described above, in step 244. Once the data packet has been processed, a SENDM command is issued by the PPU in step 246. The SENDM command differs from a SEND command in that the SENDM command does not release the processed header registers. Instead, the processed header portion is returned to the working register set after a copy of it has been unloaded. In this manner, the SENDM instruction duplicates headers. Each header generated will point to the same buffer space occupied by the data portion. Once the SENDM command is issued, the header I/O engine 247, as shown in FIG. 5, copies the processed header to the output buffer 184 and then returns the same header to the working set of header registers. Once the header has been returned to the working header registers, the PPU modifies the internal header for the next address in step 250. Next, in step 252, the PPU determines if the current address is the last address for the multicast data packet. If there are no additional addresses for the multicast data packet, then, in step 254, the PPU issues a SEND command which routes the modified header to the packet processing system and allows the removal of the header portion from the I/O header registers. If there is an additional address for the multicast data packet, the method loops back to step 246 in which the SENDM command is issued. Thus, in accordance with the invention, a multicast data packet may be rapidly communicated to each of the destination addresses without needing a separate data portion for each destination which substantially reduces the amount of buffer memory required to store a multicast data packet.

While the foregoing has been with reference to a particular embodiment of the invention, it will be appreciated by those skilled in the art that changes in this embodiment may be made without departing from the principles and spirit of the invention, the scope of which is defined by the appended claims.

I claim:

1. An apparatus for processing a data packet to determine the routing of the data packet through a communications network, the data packet having a header portion and a data portion, the apparatus comprising:

means for storing the header portion of the data packet;

means, connected to the header storing means, for processing the header portion of the data packet;

said processing means comprising:

a processing core for executing instructions for processing the header portion, means, responsive to an instruction from the processing core and a first value contained within said header portion, for searching through a route table to determine a route of the data packet, means, responsive to an instruction from the processing core and a second value contained within said header portion, for searching through a table memory for information about the destination of the data packet, wherein said table memory includes an interface table storing information related to one or more interfaces and a circuit table storing information related to one or more virtual circuits, said processing core, said route table search means and said table memory search means operating simultaneously to process said header portion and generate one of an internal header and a network media header; and means for generating a modified header portion containing at least some of the received header portion together with said generated one of the internal header and the network media header.

2. The apparatus of claim 1, wherein said header storing means comprises a first set of header registers and a second set of header registers so that while the processing means is processing the header contained in one of the set of header registers a new header portion may be stored in the other set of header registers.

3. The apparatus of claim 2, wherein said header storing means further comprises means for switching between said set of header registers.

4. The apparatus of claim 3, wherein said header storing means further comprises means for unloading a header portion from the first set of registers that has been processed by said processing core and loading a header portion into the first set of registers that has not been processed while the processing means is processing a header contained in the second set of registers.

5. The apparatus of claim 1, wherein said route table search means comprises a plurality of registers for communications between said processing core and said route table search means.

6. The apparatus of claim 1, wherein said table memory search means comprises a plurality of registers for communications between said processing core and said table memory search means.

7. The apparatus of claim 1 further comprising a central processor interface for controlling said processing core, said header storing means, said route table search means and said table memory search means and means for communicating between said central processor interface and said processing core, said header storing means, said route table search means and said table memory search means.

8. The apparatus of claim 7, wherein said communications means comprises a set of registers.

9. The apparatus of claim 1, wherein said processing core comprises an arithmetic logic unit and a sequence engine for executing instructions to process the header portion.

10. The apparatus of claim 2, wherein said header storing means further comprises means for storing information about a data packet that is being discarded so that the space in the header storing means occupied by the discarded packet and space in a data store are immediately reused.

11. The apparatus of claim 1, wherein said processing core comprises means for executing predetermined instructions that facilitate the processing of data packets.

12. The apparatus of claim 1 further comprising a central processing unit for controlling the processing core, the central processing unit comprising means for steering the processing core to one of a predetermined set of routines.

13. A method for processing a data packet to determine the routing of the data packet through a communications network, the data packet having a header portion and a data portion, the method comprising:

storing the header portion of the data packet;

processing the header portion of the data packet;

said processing comprising executing instructions for processing the header portion, searching, responsive to a first value contained within said header portion, through a route table to determine a route of the data packet, searching, responsive to a second value contained within said header portion, through a table memory for information about the destination of the data packet, wherein said table memory includes an interface table storing information related to one or more interfaces and a circuit table storing information related to one or more virtual circuits, said route table search and said table memory search operating simultaneously to process said header portion and generate one of an internal header and a network media header; and generating a modified header portion containing at least some of the received header portion together with said generated one of the internal header and the network media header.

14. The method of claim 13, wherein said header storing comprises using a first set of header registers and a second set of header registers so that while processing the header contained in one of the set of header registers a new header portion is stored in the other set of header registers.

15. The method of claim 14, wherein said header storing further comprises switching between said set of header registers.

16. The method of claim 15, wherein said header storing further comprises unloading a header portion that has been processed by said processing core from the first set of registers and loading an unprocessed header portion into the first set of registers while the processing core processes a header in the second set of registers.

17. The method of claim 15, wherein said header storing further comprises storing information about a data packet that is being discarded so that the space in the header storing means occupied by the discarded packet and space in a data store are immediately reused.

18. The method of claim 13 further comprising controlling the processing core using a central processing unit, the controlling comprises steering the processing core to one of a predetermined set of routines.

19. A method for processing data packets to determine the route of the data packet, the data packet having a header portion and a data portion, the method comprising:

receiving a header portion of an incoming data packet;

performing a flat table memory access based on a first value contained within the received header portion, wherein said flat table memory includes an interface table storing information related to one or more interfaces and a circuit table storing information related to one or more virtual circuits;

performing a route look-up search simultaneously with said flat table memory access, said route table look-up search responsive to a second value contained within the received header portion;

checking information contained within the header portion while said flat table memory access and said route look-up search are being performed for determining if the header portion is valid;

generating one of an internal header and a network media header based on the results of the route look-up search and the flat table memory access; and generating a modified header portion including the received header portion and said generated one of the internal header and the network media header.

20. The method of claim 19, wherein checking information in the header portion further comprises verifying a checksum value contained in the received header portion, decrementing a time-to-live counter contained with the header portion and generating a new checksum value to be inserted into the header portion.

21. The method of claim 19, further comprising processing a multicast data packet destined for a plurality of addresses comprising generating a header portion for each destination address, outputting a header and the same data portion for each destination address, and deleting the data portion from a buffer memory when the processing of the multicast data packet is completed.

* * * * *